(12) United States Patent
Hayashi

(10) Patent No.: US 6,340,987 B1
(45) Date of Patent: Jan. 22, 2002

(54) METHOD AND APPARATUS FOR MASKING LATENCY IN AN INTERACTIVE TELEVISION NETWORK

(75) Inventor: Michael T. Hayashi, Aurora, CO (US)

(73) Assignee: Time Warner Entertainment Company L.P., Stamford, CT (US)

(*) Notice: Subject to any disclaimer, the term of this patent is extended or adjusted under 35 U.S.C. 154(b) by 0 days.

(21) Appl. No.: 08/572,547

(22) Filed: Dec. 14, 1995

(51) Int. Cl.⁷ ............................... H04N 7/10; H04N 7/14
(52) U.S. Cl. .................. 348/13; 348/14.01; 725/61; 725/64; 725/86; 725/87; 725/118; 725/32
(58) Field of Search ..................... 348/7, 710, 712, 348/713, 473–474, 14.01; 386/83; 725/60, 61–64, 86, 87, 98, 118, 32; H04N 7/10, 7/14

(56) References Cited

U.S. PATENT DOCUMENTS

| | | | |
|---|---|---|---|
| 3,956,717 A | 5/1976 | Fisher et al. ................. 333/121 |
| 4,214,316 A | 7/1980 | Lipsky ........................ 455/141 |
| 4,449,198 A | * 5/1984 | Kroon et al. ................. 386/83 |
| 4,506,387 A | 3/1985 | Walter ........................ 359/118 |
| 4,530,008 A | 7/1985 | McVoy ........................ 380/23 |
| 4,553,161 A | 11/1985 | Citta .......................... 348/10 |
| 4,592,546 A | 6/1986 | Fascenda et al. ............. 463/29 |
| 4,823,386 A | 4/1989 | Dumbauld et al. ........... 380/13 |
| 4,991,208 A | 2/1991 | Walker et al. ................ 380/20 |
| 5,014,125 A | * 5/1991 | Pocock et al. ................ 348/7 |
| 5,046,090 A | 9/1991 | Walker et al. ................ 380/5 |
| 5,093,718 A | 3/1992 | Hoarty et al. ................ 348/7 |
| 5,168,353 A | 12/1992 | Walker et al. ................ 348/6 |
| 5,220,420 A | 6/1993 | Hoarty et al. ................ 348/12 |
| 5,255,267 A | 10/1993 | Hansen et al. ............... 370/401 |
| 5,311,423 A | 5/1994 | Clark .......................... 705/8 |
| 5,333,272 A | * 7/1994 | Capek et al. ................. 395/275 |
| 5,343,239 A | 8/1994 | Lappington et al. .......... 348/12 |
| 5,357,276 A | 10/1994 | Banker et al. ................ 348/7 |
| 5,361,091 A | 11/1994 | Hoarty et al. ................ 348/7 |
| 5,383,112 A | 1/1995 | Clark .......................... 705/8 |
| 5,390,337 A | 2/1995 | Jelinek et al. ............... 455/5.1 |
| 5,394,394 A | 2/1995 | Crowther et al. ........... 370/392 |
| 5,400,402 A | 3/1995 | Garfinkle ..................... 380/20 |
| 5,412,720 A | 5/1995 | Hoarty ........................ 380/15 |
| 5,421,031 A | 5/1995 | De Bey ....................... 455/5.1 |
| 5,422,674 A | 6/1995 | Hooper et al. .............. 348/409 |
| 5,423,555 A | 6/1995 | Kidrin ......................... 463/31 |
| 5,425,027 A | 6/1995 | Baran .......................... 370/395 |
| 5,426,699 A | 6/1995 | Wunderlich et al. ......... 380/20 |
| 5,442,700 A | 8/1995 | Snell et al. ................... 380/15 |
| 5,446,726 A | 8/1995 | Rostoker et al. ............. 370/232 |
| 5,452,297 A | 9/1995 | Hiller et al. ................. 370/395 |

(List continued on next page.)

OTHER PUBLICATIONS

Wink Communications, Enabling Mass Market Interactive TV, p. 11–12, Jan. 1995.*

Adams, Michael, "Network Design and Implementation of a large-scale, ATM, Multimedia Network," *Engineering Conference Notes* from NETWORLDsm+INTEROP® 95, Las Vegas, NV (Mar. 27–31, 1995).

(List continued on next page.)

*Primary Examiner*—Reinhard J. Eisenzopf
*Assistant Examiner*—Linus H Lo
(74) *Attorney, Agent, or Firm*—Holland & Hart LLP

(57) ABSTRACT

A method and apparatus for masking latency in an interactive television network. One embodiment of the invention initially receives a command pertaining to an interactive selection from a viewer. The invention then determines if latency is associated with the execution of the received command. If so, the invention (1) begins processing the command, and (2) presents a latency-masking presentation.

4 Claims, 7 Drawing Sheets

U.S. PATENT DOCUMENTS

| | | | | |
|---|---|---|---|---|
| 5,453,979 A | | 9/1995 | Schibler et al. | 370/395 |
| 5,455,701 A | | 10/1995 | Eng et al. | 359/135 |
| 5,455,820 A | | 10/1995 | Yamada | 370/413 |
| 5,455,825 A | | 10/1995 | Lauer et al. | 370/413 |
| 5,459,722 A | | 10/1995 | Sherif | 370/395 |
| 5,666,293 A | * | 9/1997 | Metz et al. | 395/200.5 |
| 5,764,275 A | * | 6/1998 | Lappington et al. | 348/12 |
| 5,796,945 A | * | 8/1998 | Tarabella | 395/200.9 |
| 5,802,284 A | * | 9/1998 | Karlton et al. | 395/200.09 |

OTHER PUBLICATIONS

Adams, Michael, "Real Time MPEG Asset Delivery over ATM," *NCIA Technical Papers*, 1995:315–326 (1995).

News Release, "Time Warner Introduces World's First Full Service Network in Orlando," TIMEWARNER CABLE Full Service Network, Maitland, FL, 32751 (Dec. 14, 1994).

Product Information Package from Wink Communications, 2061 Challenger Drive, Alameda, CA 94501 (1995).

Request for Propsals, "Development of a Full Service Network: A request by Time Warner for assistance in building a full service telecommunications network" (Feb. 11, 1993), Time Warner Cable, Denver Co.

Vecchi, Mario P., and Adams, Michael, "Traffic MAnagement for Highly Interactive Transactional System," *NCTA Technical Papers*, 1995:258–266 (1995).

* cited by examiner

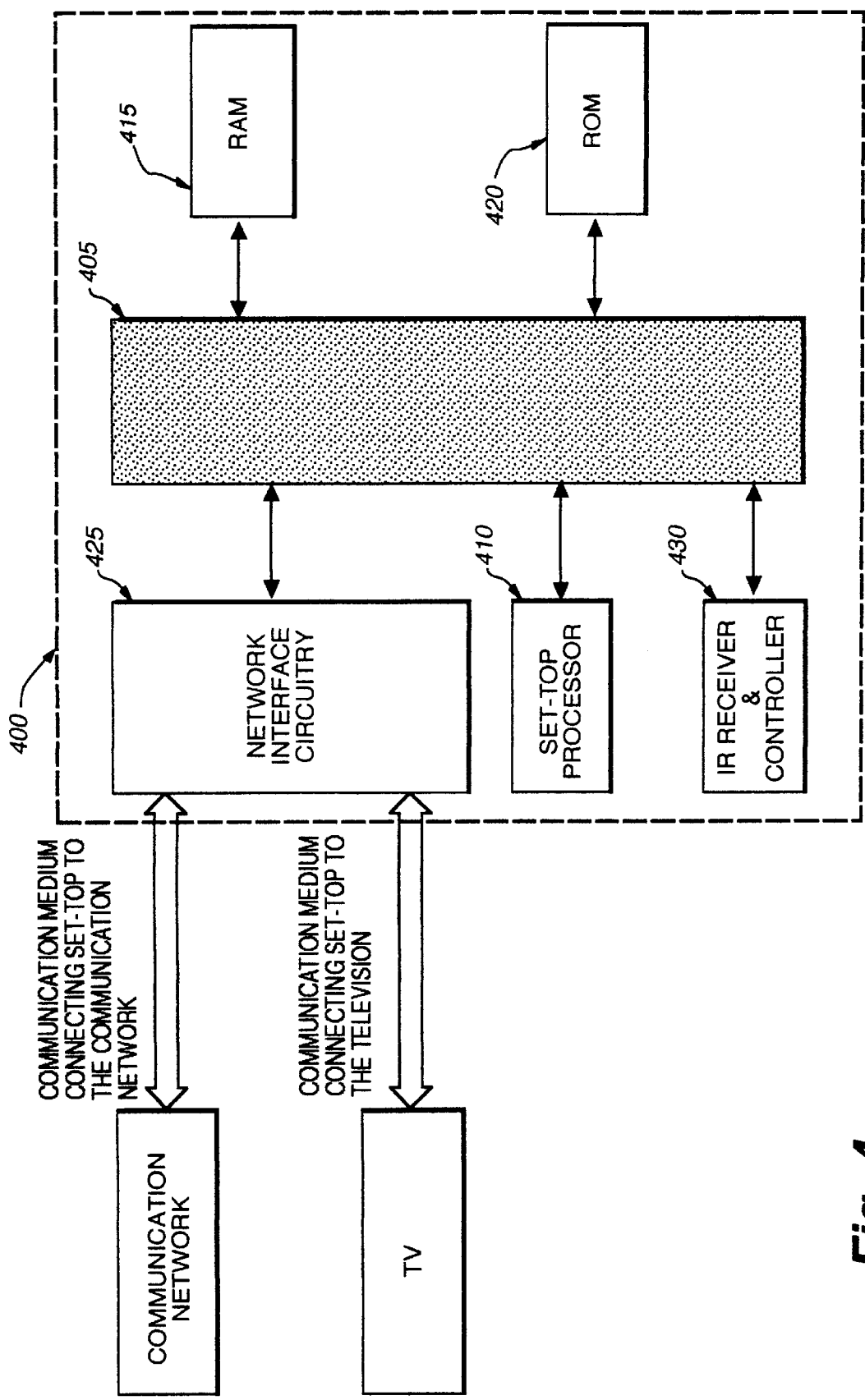

METHOD AND APPARATUS FOR MASKING LATENCY IN AN INTERACTIVE TELEVISION NETWORK

BACKGROUND OF THE INVENTION

Traditional broadcast cable systems have used television as a passive device, that only allows a viewer to control the volume and channel, while reserving control of the content as well as the presentation time and format for the cable operator. In recent years, a number of interactive systems have been created, in order to enable viewers to use their televisions as interactive devices.

Specifically, with the advent of interactive services in the home entertainment field, televisions have become active devices, that allow their viewers greater flexibility and control over the content, the presentation time, and the presentation format of their selected interactive applications. Interactive applications are stored programs, whose operations are wholly or partly controlled by commands from local viewing nodes of the interactive system.

Interactive systems utilize a mix of broadcast and point-to-point communication modes. In particular, interactive systems transmit shared, one-way, broadcast digital information streams to all their subscribers, in order to provide cable and network programming to their subscribers. These systems also utilize a number of dedicated, two-way communication paths to (1) provide interactive applications from a central service source to a local viewing node, and (2) relay commands from the local viewing node to the central service. In addition, some interactive systems transmit interactive applications through shared information streams.

Establishing a dedicated communication link expends a certain amount of an interactive system's resources (such as a service source's server resources, a communication network's transmission frequency, a service source's switching resources, etc.). Consequently, due to financial considerations, efficient interactive systems are often designed to handle specified peak dedicated-path-usage rates, which are computed by using statistics and probability.

In turn, the dedicated-path-usage rate design at times reduces the speed for executing commands pertaining to interactive selections. In other words, the peak rate design introduces latency in processing some of the interactive operations. In addition, some interactive commands inherently have latency associated with them, because their execution is dependent on services external to the interactive television network. For example, orders for purchasing products with credit cards experience latency due to the credit card confirmation operation, which is performed external to the interactive network.

When interactive television systems experience latency, they must provide entertaining presentations to mask the latency, because these systems are oriented towards entertainment, and therefore must not be static in nature. Consequently, there is a need in the art for a method and apparatus for masking latency in an interactive television network.

SUMMARY OF THE INVENTION

The invention provides a method and apparatus for masking latency in an interactive television network. One embodiment of the invention initially receives a command pertaining to an interactive selection from a viewer. The invention then determines if latency is associated with the execution of the received command. If so, the invention presents a latency-masking presentation.

BRIEF DESCRIPTION OF THE DRAWINGS

The novel features of the invention are set forth in the appended claims. However, for purpose of explanation, several embodiments of the invention are described by reference to the following figures.

FIG. 4 presents one embodiment of a set-top used in the interactive television system of FIG. 1.

DETAILED DESCRIPTION OF THE INVENTION

The invention provides a method and apparatus for masking latency in an interactive television network. In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

The invention is adapted to operate in an interactive television communication system. One embodiment of the invention initially receives a command pertaining to an interactive selection from a viewer. The invention then determines if latency is associated with the execution of the received command. If so, the invention (1) begins processing the command, and (2) presents an entertaining latency-masking presentation (such as a scenic picture).

Figure 1:
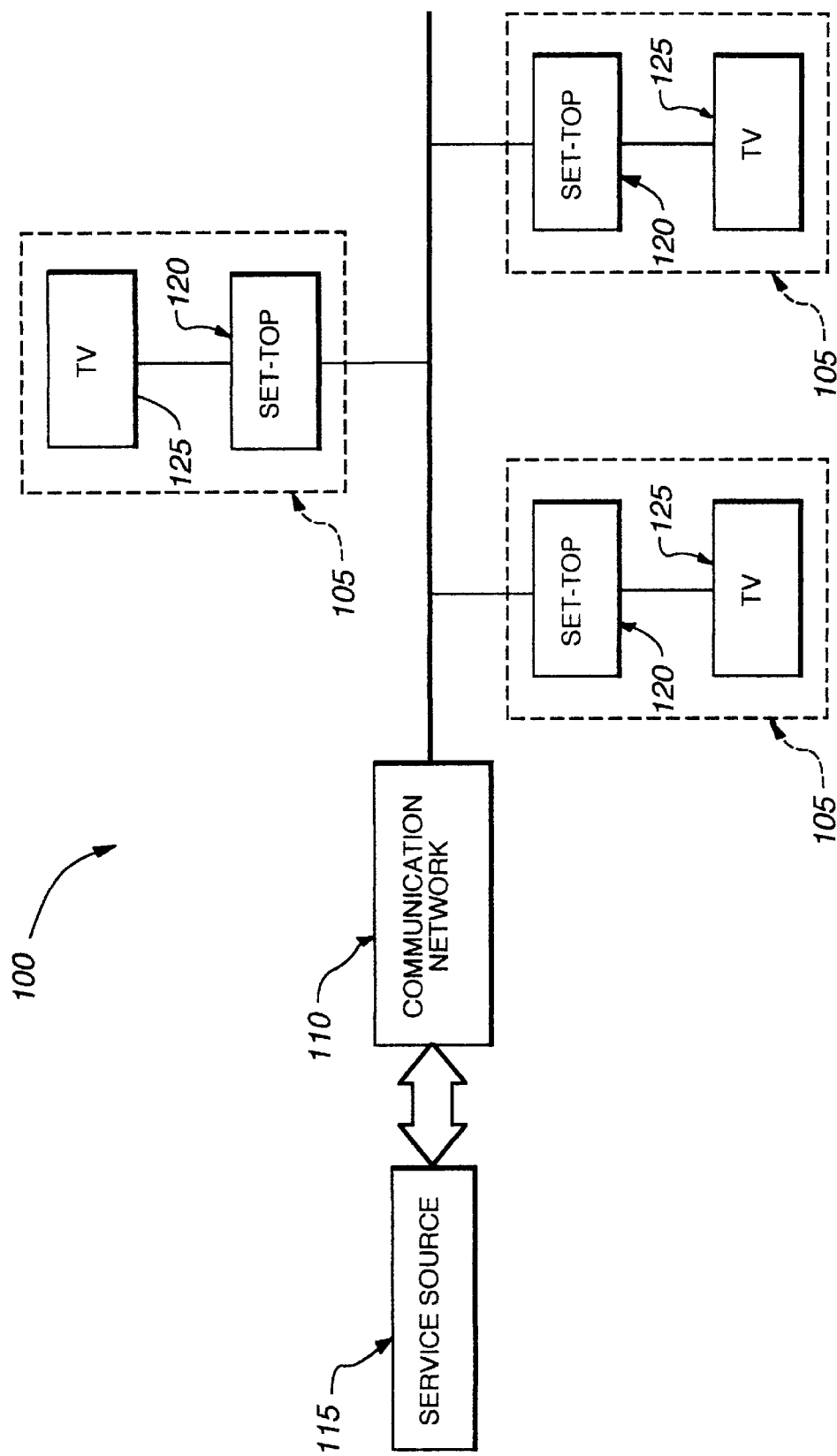
FIG. 1 presents an interactive television system used by the invention.

FIG. 1 presents an interactive television system 100 used by one embodiment of the invention. This system includes a number of home terminal nodes 105, a communication network 110, a service source 115. As shown in FIG. 1, each home terminal node 105 includes a set-top 120 and a television 125. Each set-top controls the operation of its corresponding television. In addition, through communication network 110, a set-top (1) establishes a communication link between the television viewer and the service source, (2) presents, via the television, selectable programming options provided by the service source to the viewer, and (3) relays program selections from the viewer to the service source.

Figure 2:
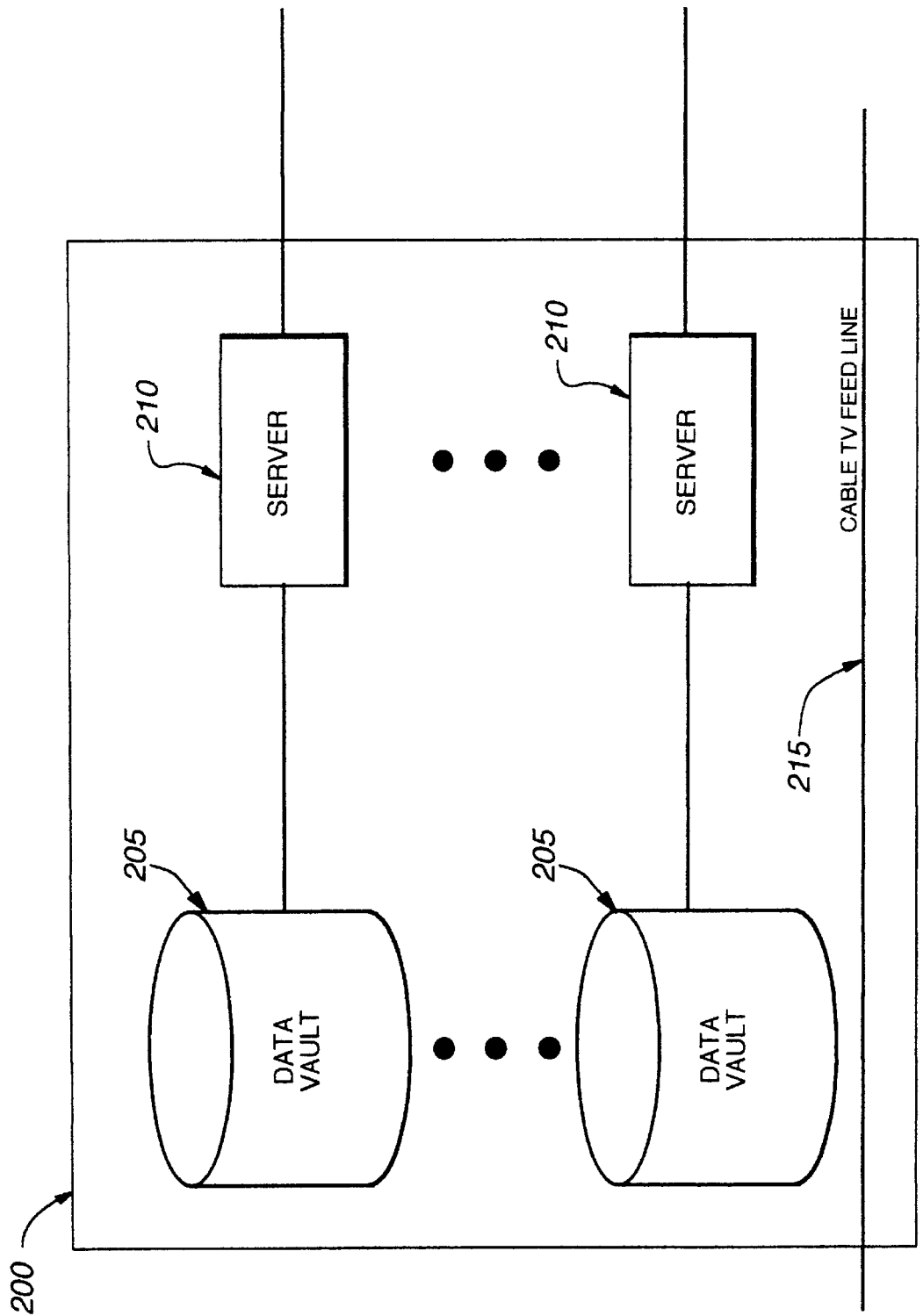
FIG. 2 presents an example of a service source used in the interactive television system of FIG. 1.

FIG. 2 presents an example of a service source used in the interactive communication system of FIG. 1. As shown in FIG. 2, one example of the service source includes a number of data storage vaults 205, a number of media servers 210, and a cable TV feedline 215. Service source 200 utilizes data storage vaults 205 and media servers 210 to provide a variety of interactive digital services to the subscribers of the system. Specifically, data storage vaults 205 are used to store the digital programming content, and media servers 210 are used to retrieve the stored digital media in response to requests from the home terminal nodes.

The retrieved digital program can then be transmitted through a shared digital information stream or a dedicated digital information stream. A shared digital information stream is used to transmit data to a number of subscribers, while a dedicated digital information stream is used to transmit data to a specific user. In addition, a digital information stream can be assigned all or part of a frequency band used by the network. As further shown in FIG. 2, service source 200 also has a cable feedline 215, which receives cable programming from the local cable company and supplies this programming to the network. The network then broadcasts the cable programming to all of the system's subscribers on shared information stream.

Figure 3A:
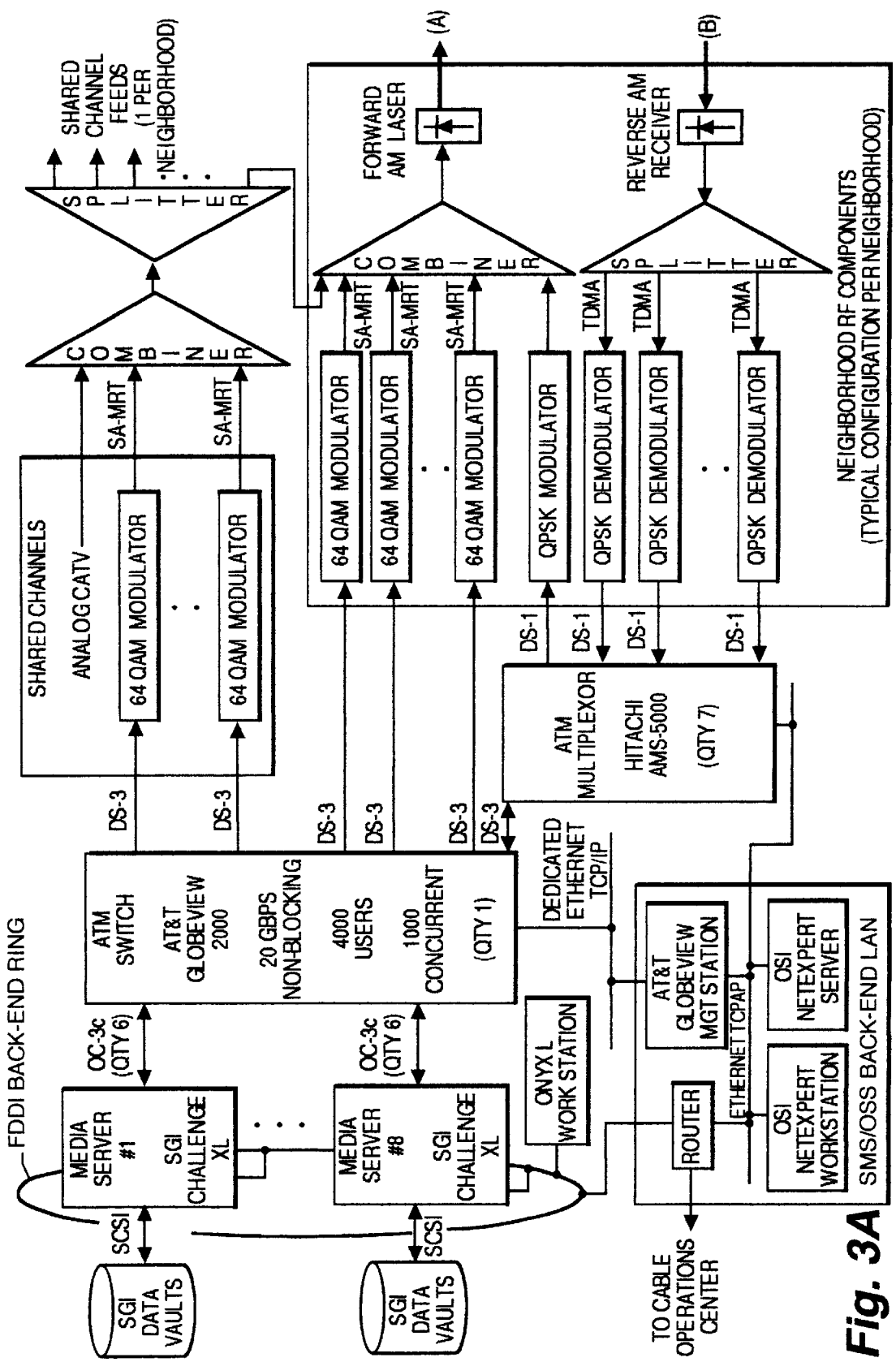
FIG. 3 presents another interactive television system used by the invention.
Figure 3B:
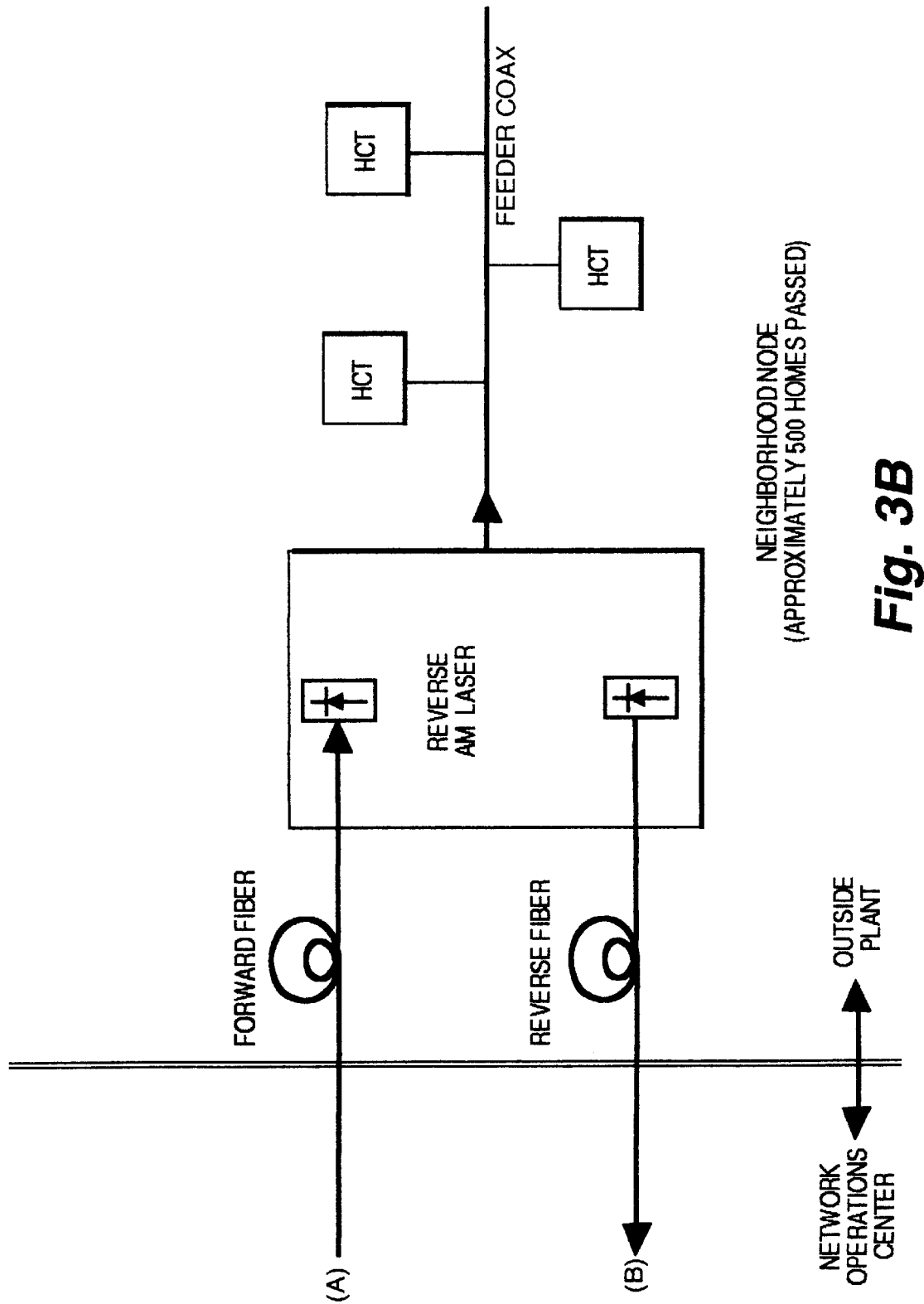

FIG. 3 presents another interactive entertainment system used by the invention. A description of this interactive entertainment system is provided in the United States Application entitled "A Method For Message Addressing In A Full Service Network," filed on Dec. 14, 1995, and assigned to the assignee of the present application. The disclosure of this application is incorporated in the present application by reference.

FIG. 4 presents a set-top 400 used in interactive television network 100 of FIG. 1. As mentioned above, the set-top device controls the operation of its corresponding television. In addition, the set-top (1) establishes a communication link between the television viewer and the service source, (2) presents, via the television, selectable programming options provided by the service source to the viewer, and (3) relays program selections from the viewer to the service source.

As shown in FIG. 4, set-top 400 includes internal bus 405, processor 410, random access memory (RAM) 415, read-only memory (ROM) 420, network interface 425, and infrared (IR) controller 430. Bus 405 collectively represents the communication interface between the numerous internal modules of set-top 400. In addition, this set-top uses processor 410 for processing digital signals, and thereby controlling the operation of the set-top. Processor 410 is directed by the firmware and software instructions that respectively reside in ROM 420 and RAM 415.

Set-top 400 also uses RAM 415 to store temporary variables or other intermediate information during the operation of the processor. As further shown in FIG. 4, set-top 400 also includes network interface 425, which represents all interface circuitry utilized by set-top 400 for communicating to the network or the television through external communication media (such as coaxial cables). Finally, set-top 400 includes IR controller 430 for receiving and decoding communications from a remote control operated by the viewer.

Figure 5:
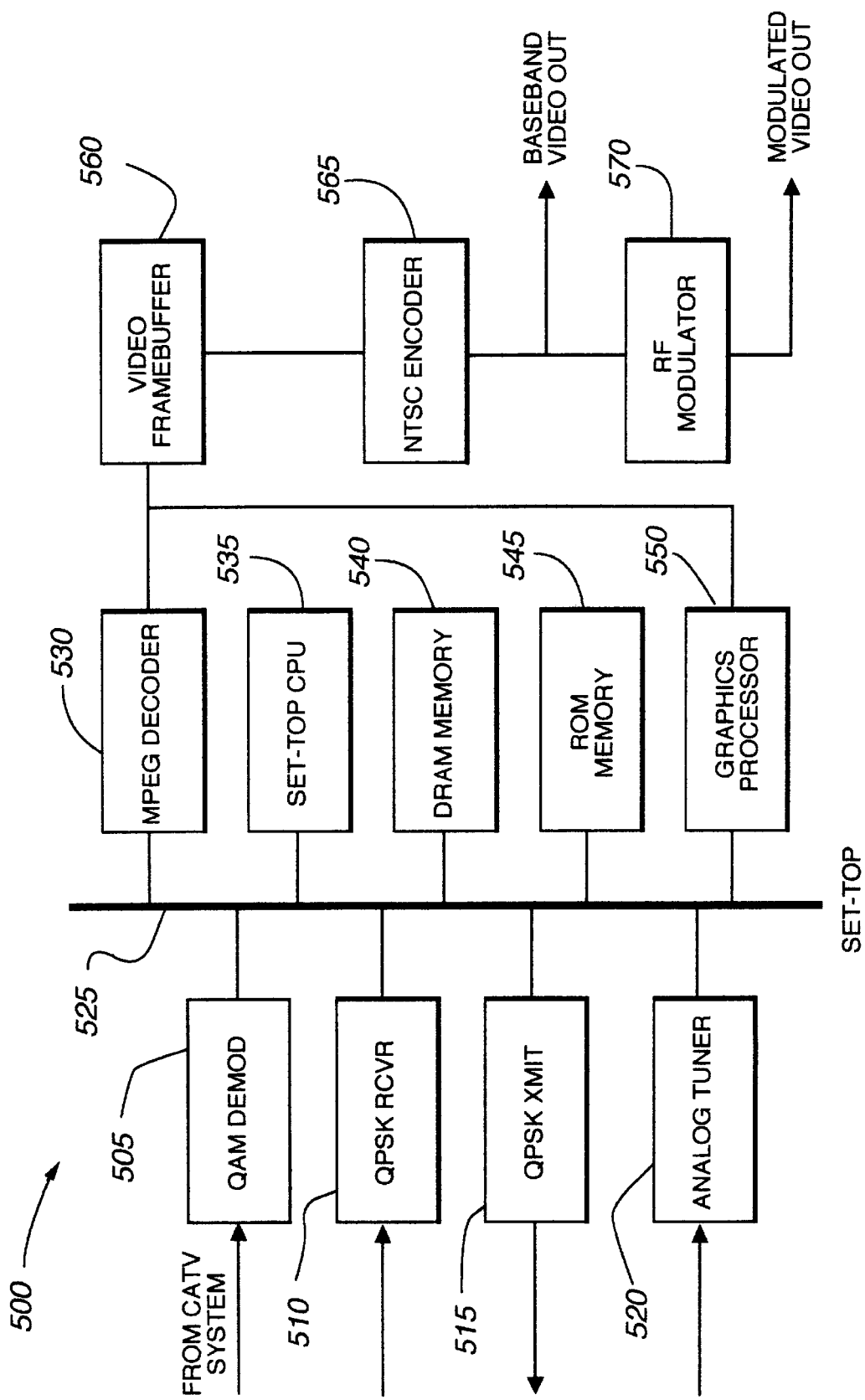
FIG. 5 presents another embodiment of a set-top used in the interactive television system of FIG. 1.

FIG. 5 presents another embodiment of home terminal set-top 120 used by the invention. A description of this interactive entertainment system is provided in the United States Application entitled "Method And Apparatus For Enticing A Passive Television Viewer By Automatically Playing Promotional Presentations Of Selectable Options In Response To The Viewer's Inactivity," filed on Dec. 13, 1995, and assigned to the assignee of the present application. This description is incorporated in this application by reference.

Figure 6:
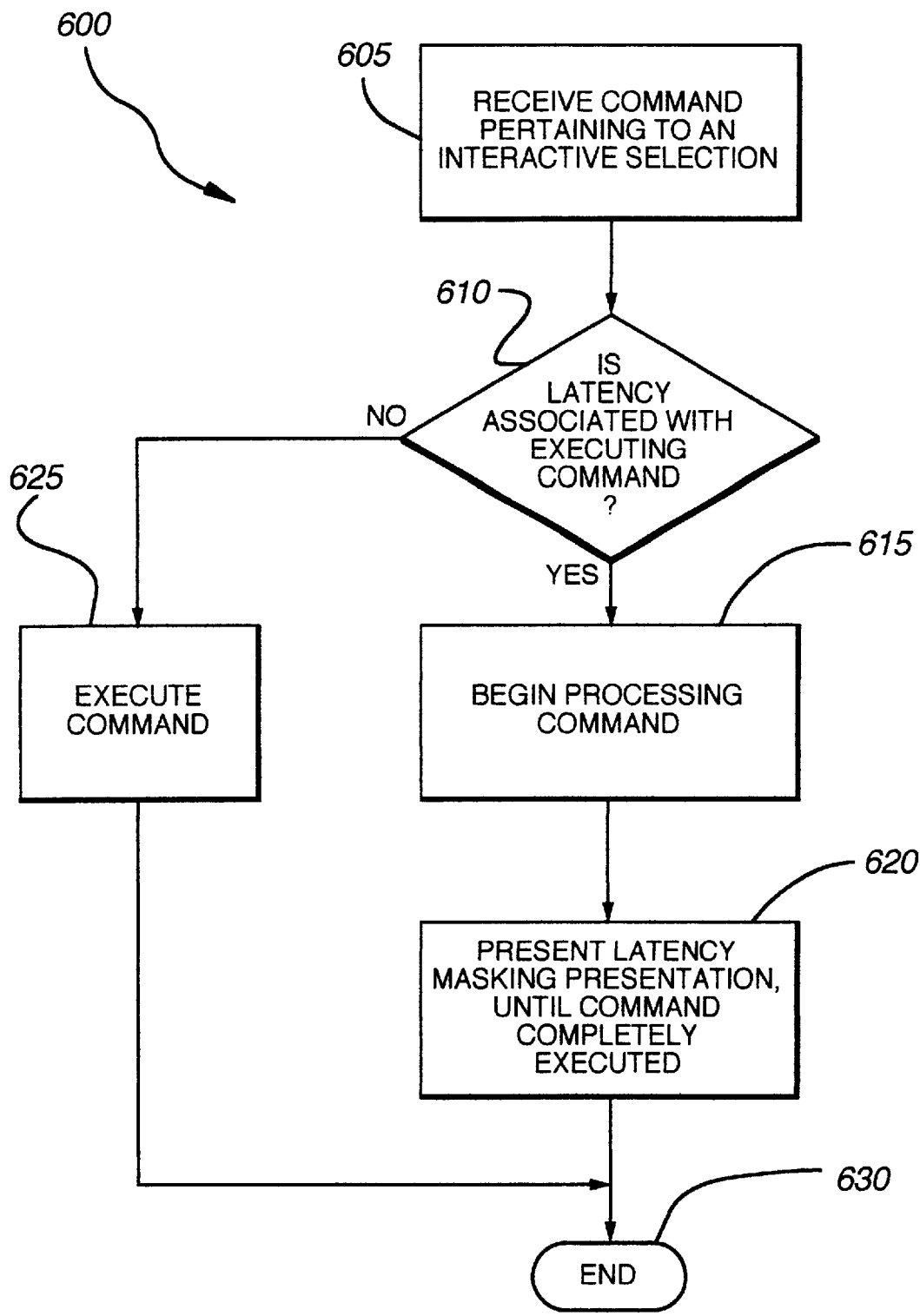
FIG. 6 presents one embodiment of the invention.

FIG. 6 presents one embodiment of the invention for masking latency. This embodiment of the invention can be implemented as a software code (i.e., a source code residing in a RAM) or a firmware code (i.e., a source code residing in a ROM) of the set-top or the server. The following description pertains to the embodiment of the invention that is partly implemented as a software code of the set-top and partly implemented as a software code which is part of a selected interactive application. In a more specific embodiment of the invention, this software code is one of the selected application's first sets of code that are downloaded to the set-top RAM.

The initial step in the flowchart of FIG. 6 is start step 605. At this step, process 600 receives a command pertaining to an interactive selection of an interactive application that is being presented to a viewer. The process then transitions to step 610, during which it determines whether latency is associated with the execution of the received command. If not, the process transitions to step 625 to execute the command, and then to step 630 to terminate its operation.

However, if the process determines that latency is associated with the execution of the command, it transitions to step 615 to begin the processing of the command. Next, the process transitions to step 620 to supply an entertaining latency-masking presentation to the television, until the command is completely executed. From step 620, the process transitions to step 630 to terminate its operation.

One embodiment of process 600 determines (at step 610) that latency is associated with the execution of the received command by decoding one of the first sets of code of the application pertaining to the received command. Similarly, a set of software code of the received command's application provides one embodiment of process 600 with the latency-masking presentation.

Alternatively, another embodiment of process 600 determines the potential for latency, and/or obtains the entertaining latency-masking presentation, independently of the received command's application. For example, one embodiment of process 600 uses a latency Boolean variable for determining latency of each potential command. In addition, one embodiment of process 600 displays a latency-masking presentation, whose application is stored the local viewing node, whenever it determines that latency is associated with executing a received command (e.g., determines that the latency Boolean variable of the received command is TRUE).

While the invention has been described with reference to numerous specific is details, one of ordinary skill in the art would recognize that the invention can be embodied in other specific forms without departing from the spirit of the invention. For example, one of ordinary skill in the art would recognize that, although the invention has been described by reference a home terminal node that includes a set-top terminal and a television, alternative embodiments of the invention utilize home terminal nodes that include a cable modem and a computer. In these embodiments, a display device of the computer is used for displaying the transmitted programming.

In addition, even though one embodiment of the invention has been described by reference to a terrestrial communication network, one of ordinary skill in the art would realize that an alternative embodiment of the invention utilizes a satellite communication system. Thus, one of ordinary skill in the art would understand that the invention is not to be limited by the foregoing illustrative details, but rather is to be defined by the appended claims.

I claim:

1. In an interactive television network having a plurality of viewers, a method of masking latency, said method comprising the steps of:
   receiving a command pertaining to a given interactive selection from a given viewer;
   determining whether latency in presenting said given interactive selection to said given viewer is associated with said command;
   if latency is not associated with said command, executing said command and presenting said given interactive selection to said given viewer; and if latency is associated with said command, beginning execution of said command, temporarily presenting a latency masking presentation to said given viewer, and thereafter presenting said given interactive selection to said given viewer.

2. The method of claim 1 wherein said determining step is performed by decoding code that is associated with said command.

3. Latency masking apparatus adapted to operate in an interactive television network having a plurality of viewers, said apparatus comprising:

receiving means for receiving from a given viewer a command pertaining to an given interactive selection;

determining means, coupled to said receiving means, for determining whether latency is associated with execution of said command; and presentation means, coupled to said determining means, for executing said command and presenting said given interactive selection to said given viewer when latency is not associated with execution of said command, or for beginning execution of said command and temporarily presenting a latency masking presentation to said given viewer when latency is associated with execution of said command, followed by presenting said given interactive selection to said given viewer.

4. The apparatus of claim 3 wherein said determining means operates to decode code that is associated with said command in order to determine whether latency is associated with execution of said command.

* * * * *